United States Patent [19]
Wakefield

[11] Patent Number: 5,544,955
[45] Date of Patent: Aug. 13, 1996

[54] LIGHT WEIGHT BEARING APPARATUS AND ASSEMBLY METHOD

[75] Inventor: David L. Wakefield, Penfield Township, Lorain County, Ohio

[73] Assignee: Argo-Tech Corporation, Cleveland, Ohio

[21] Appl. No.: 351,942

[22] Filed: Dec. 8, 1994

[51] Int. Cl.$^6$ ............................................. F16C 33/04
[52] U.S. Cl. ................................ 384/295; 384/912
[58] Field of Search .............................. 384/295, 296, 384/192, 912, 292

[56] References Cited

U.S. PATENT DOCUMENTS

| | | | |
|---|---|---|---|
| 4,432,659 | 2/1984 | Tuckey | 384/295 |
| 4,509,290 | 4/1985 | Stanfield | 384/296 |
| 5,219,231 | 6/1993 | Sheedy | 384/192 |
| 5,388,915 | 2/1995 | Huber | 384/295 |

*Primary Examiner*—Lenard A. Footland
*Attorney, Agent, or Firm*—Fay, Sharpe, Beall, Fagan, Minnich & McKee

[57] ABSTRACT

A two-piece mechanical joint light weight bearing includes a liner of leaded bronze joined with an outer sleeve of an aluminum alloy. The joint consists of a straight cylindrical section and a threaded section along the axial direction of the bearing. Both the threaded and straight cylindrical sections of the bearing employ a radial interference fit to ensure positive contact between the bronze and aluminum materials. The interference fit is selected to compensate for radial differential thermal expansion between the liner and sleeve and provides a prevailing torque to prevent rotational movement between the liner and sleeve. A molded elastomer seal is located on a first end of the bearing to provide a seal between the liner and sleeve. A method of assembling the bearing includes establishing a relative temperature differential between the component parts, assembling the component parts while held at the differential temperature and then stabilizing the completed assembly at room temperature.

15 Claims, 5 Drawing Sheets

LIGHT WEIGHT BEARING APPARATUS AND ASSEMBLY METHOD

BACKGROUND OF THE INVENTION

1. Field of the Invention

The present invention relates generally to light weight bearings and methods of manufacturing same and, more particularly, to bearings of the type including a light weight outer sleeve or carrier which is interference fit connected with a heavier internal insert, liner or load bearing surface. Assembly of bearings of this type includes developing a relative temperature differential between the outer sleeve and the inner liner whereby, after inserting the liner into the sleeve, a radial interference connection is established when the sleeve and inner liner composite connection reaches an equilibrium temperature.

2. Description of the Prior Art

Prior to the instant invention, several alternative approaches have been explored in the construction of light weight bearings with varying degrees of success. The basic engineering problem to be solved has been one of providing suitable bearing working surfaces, such as of a leaded bronze material, to absorb the bearing loads from rotating parts while simultaneously employing lighter weight materials, such as aluminum alloys, to transmit the mechanical loads and the frictional heat generated by the working surfaces, to a larger overall housing structure.

A number of adhesive bonding methods have been attempted whereby a leaded bronze insert is joined to an outer light weight sleeve carrier using an adhesive substance. According to this design the leaded bronze insert provides a bearing working surface while the light weight carrier provides mechanical integrity. However, bearings using the adhesive bonding methods often experience fluid leakage between the bonded pieces. Of course, this fluid leakage is not usually designed into the product and typically degrades bearing performance. In addition, bonding methods are sensitive to bearing geometry specifications as well as process variations, cleanliness, and bonding material composition. The variations in assembly processes include surface preparation and cleanliness, adhesive application and its uniformity, and curing methodologies. In-service conditions such as loading, pressure, temperature and fluid properties can mechanically damage and/or chemically alter the bond joint causing it to fail which, in turn, degrades the service life of the apparatus and may induce secondary failures.

In addition to the acute sensitivity of these bearings to the bonding process variations, the adhesive used to connect the components often tends to act as a thermal insulator, thus inhibiting the ability of the leaded bronze insert to dissipate the heat developed through friction, into the surrounding structure. Overall, bearing load capacity is impaired due to heat build-up, which directly reduces the viscosity and hydrodynamic load capacity of the working fluid between the moving parts in the bearing. Further, adhesives are subject to possible long term degradation in service due to thermal exposure such as extremes in temperature, thermal cycling and differential part expansion. Still further, the adhesives are susceptible to chemical attack which can lead to catastrophic failure of the bond joint itself. Lastly, process variations make it virtually impossible to accurately predict bond joint life. One solution is to calculate an anticipated bond joint life and replace the bearing well in advance of its life expectancy. However, this is usually commercially unfeasible.

An alternative strategy to the various adhesive bonding methods mentioned above includes the use of elastomeric seals between two or more light weight bearing materials which are mechanically assembled into a composite bearing structure. Such bearings, however, are susceptible to leakage due to degradation of the seals such as by chemical attack, thermal cycling, differential expansion of the various bearing parts and wide temperature extremes. In addition, elastomeric seals tend to wear prematurely due to relative motion between or among the various pieces comprising the composite bearing structure. Weakened bearing seals may extrude through clearance gaps or otherwise rip, tear, or abrade. Further, overall bearing load capability may be impaired due to the effects of manufacturing tolerances of each of the individual parts comprising the composite bearing assembly. This can result in excessive misalignment between the working surfaces of the bearing and the associated rotating or otherwise moving parts. Additionally, discontinuities such as clearance gaps between the parts disrupt the efficient conduction of frictional thermal energy away to the surrounding structure, impairing the overall load carrying ability of the bearing. Lastly, as the number of pieces comprising the composite bearing structure increases, the likelihood of improper assembly increases as does the overall labor, raw material, and resultant manufacturing cost. This becomes significant over the total product service life when multiple assemblies or overhauls occur.

A third alternative light weight bearing construction strategy includes a metallurgical bonding approach whereby a bronze liner is brazed or soldered to a light weight aluminum carrier. Casting processes have also been attempted with varying degrees of success. Overall, metallurgical bonding overcomes most of the leakage, heat conductance and part size tolerance problems associated with the adhesive bonding and multiple piece elastomeric sealing methods discussed above. However, the differential thermal expansion experienced between the bronze liner and aluminum carrier tends to negatively influence overall durability problems, particularly in bearings of large diameter or high length/diameter (L/D) ratios. Also, material properties such as strength, ductility, and thermal expansion can very within a single bond zone, particularly in cast bearings, due to alloying, different rates of cooling or solidification and for other reasons.

Properties of the metallurgical bonds also tend to vary over time, due to thermal exposure, diffusion and migration of constituents, and other effects such as work hardening or fatigue. Metal matrix composites (MMCs) have been used in an attempt to reduce or eliminate differential thermal expansion in bearings which rely on metallurgical bonds. However, problems have been encountered with reduced material ductility in the MMCs, and material property variability remains a troublesome engineering problem. In any case, light weight bearings employing the metallurgical bonding techniques also remain highly susceptible to process variations and tend to be quite expensive to produce.

BRIEF SUMMARY OF THE INVENTION

The subject invention provides a simple mechanical technique to effect a unitary finished bearing part which combines the load carrying and wear properties of a primary bearing material with a lighter carrier material. More particularly, in accordance with the present invention, a leaded bronze liner insert is interference connected by a radial shrink fit to an outer aluminum alloy carrier sleeve housing sleeve structure. The characteristics of the mechanical joint between the separate pieces is reliably predictable and does not significantly vary from part to part or over time in service as do the characteristics of the adhesive or metallurgical bonding joints. The two-piece assembly of the subject invention behaves as if it were a single piece, eliminating the relative motion between the bearing parts which occurs in typical multiple piece assemblies utilizing elastomeric seals as described above. The mechanical joint between the insert and sleeve of the present invention permits the use of a wider range of materials and is significantly less sensitive to process variations than the bonded part bearings discussed above.

One significant advantage of the present invention over bearings manufactured using an adhesive bonding technique is that a well-defined, high conductivity heat dissipation path is established between the leaded bronze insert and aluminum alloy sleeve through a radial interference fit connection therebetween. This eliminates the insulative effects of the adhesive material itself which effects are compounded by air gaps in the adhesive material. Other advantages of the present invention over bearings fabricated using adhesive bonding techniques include a separation of the load carrying function from the leakage prevention function, improved leakage control by a more positive sealing system which includes an O-ring, and elimination of bond and seal degradation due to breakdown of the adhesive over time while in service. Reduced susceptibility to process variations as well as improved manufacturing control are realized by the simple and efficient two piece construction of the present invention.

Another advantage of the present invention over the mechanical multi-piece bearings discussed above is an improved load and heat dissipation capacity through a well defined load path along the full axial joint length between the leaded bronze liner in intimate contact with the aluminum sleeve or carrier. Both assembly time and the likelihood of misassembly or damage during manufacture are reduced as a result of the simple two piece construction of the present bearing assembly. This construction also reduces tolerance stack-up and misalignment which can result between the parts of a multi-piece bearing and which can lead to problems such as seal extrusion through gaps and unwanted relative motion between parts.

A further advantage of the present invention relative to bearings fabricated using metallurgical bonding techniques is a reduced sensitivity to thermal expansion and thermal cycling, both of which act to weaken the metallurgically bonded joint. In the construction of the present invention, thermal expansion effects on joint integrity and durability can be quantitatively assessed and thereby anticipated and controlled.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and alternative embodiments which will be described in detail in this specification and illustrated in the accompanying drawings which form a part hereof and wherein.

DETAILED DESCRIPTION OF THE DRAWINGS

Figure 1:
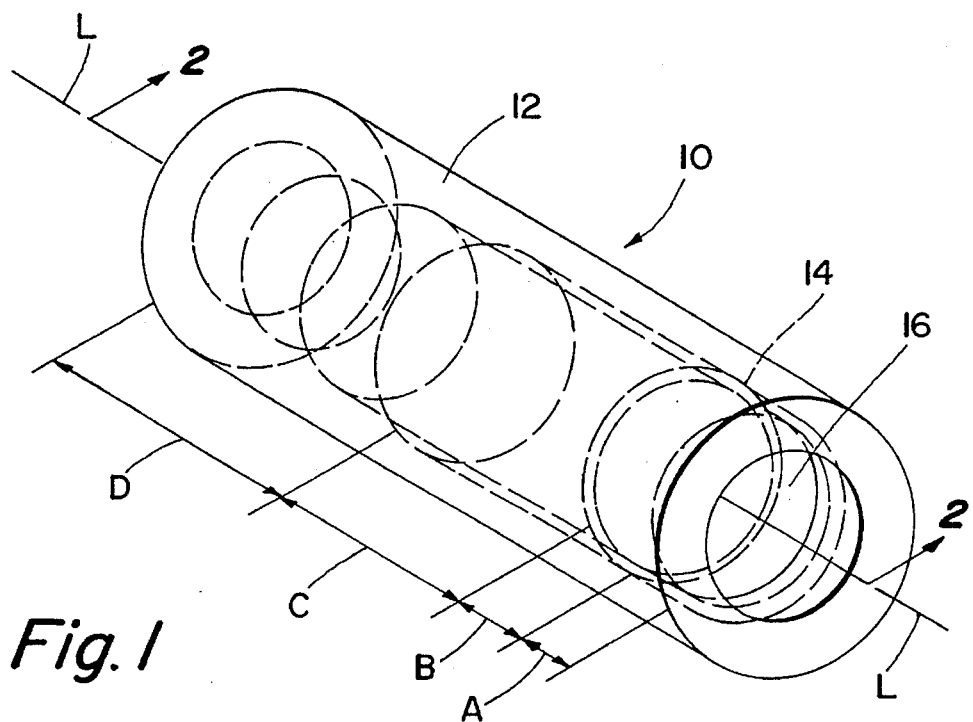
FIG. 1 is a schematic perspective view of the light weight bearing apparatus according to the present invention.

Referring now to the drawings wherein the showings are for the purposes of illustrating the preferred and alternative embodiments of the invention only and not for the purposes of limiting same, the FIGURES show a light weight bearing apparatus 10 and an assembly method 100 for manufacturing same. As illustrated in FIG. 1, bearing apparatus 10 includes an outer carrier or sleeve 12 which surrounds and holds fixed therein an elongated cylindrical liner or insert 14. The insert is provided with an axial bore 16 having a longitudinal axis L for receiving an operatively associated external rotating or reciprocating member (not shown). The bearing apparatus 10 is a composite two piece structure and generally includes a thrust flange region A, a threaded region B, a cylindrical section C, and an optional tail section D. Each of the bearing sections will be described in detail below.

Figure 2:
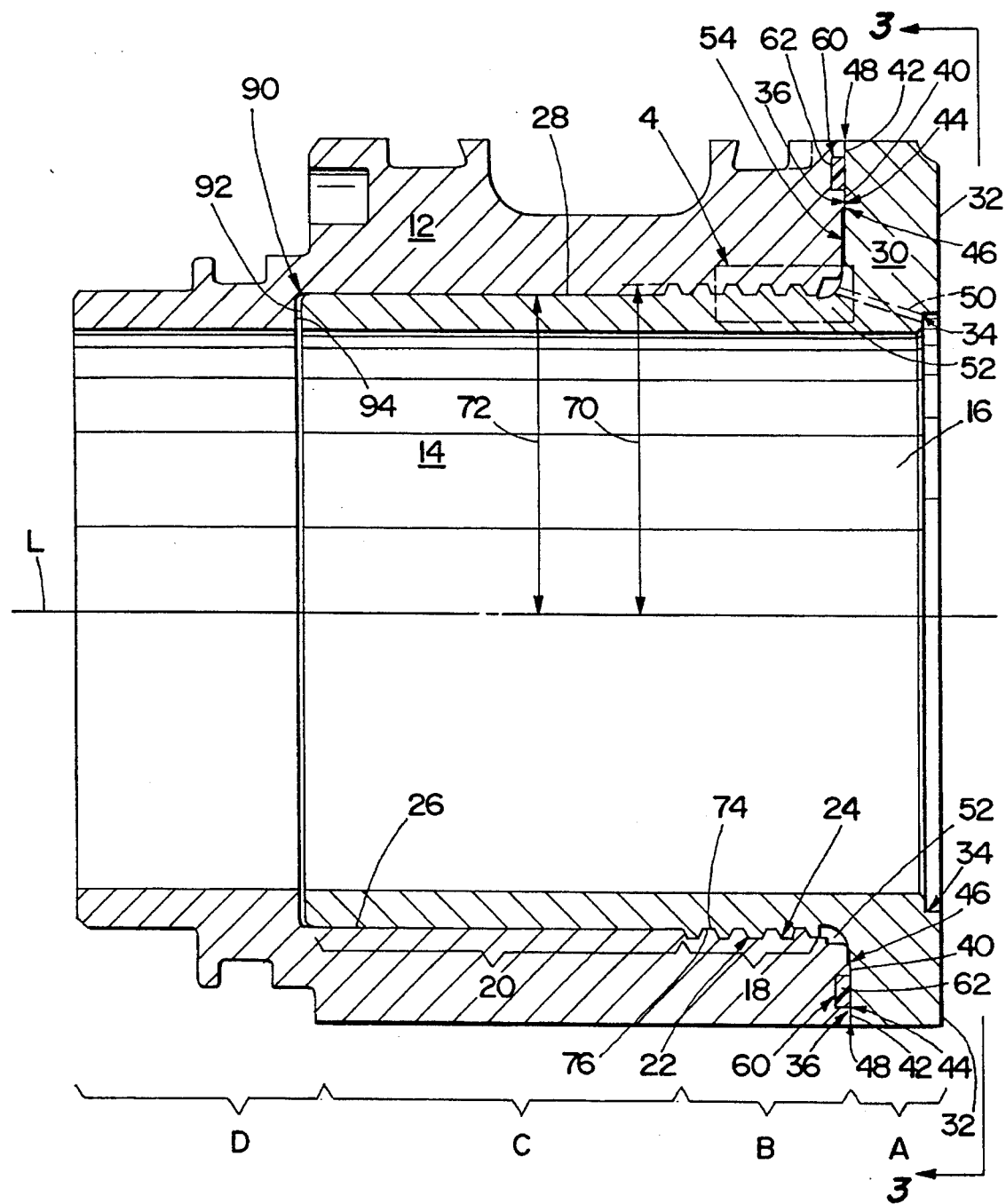
FIG. 2 is an axial cross-sectional view of the bearing apparatus illustrated in FIG. 1 taken through line 2—2.
Figure 3:
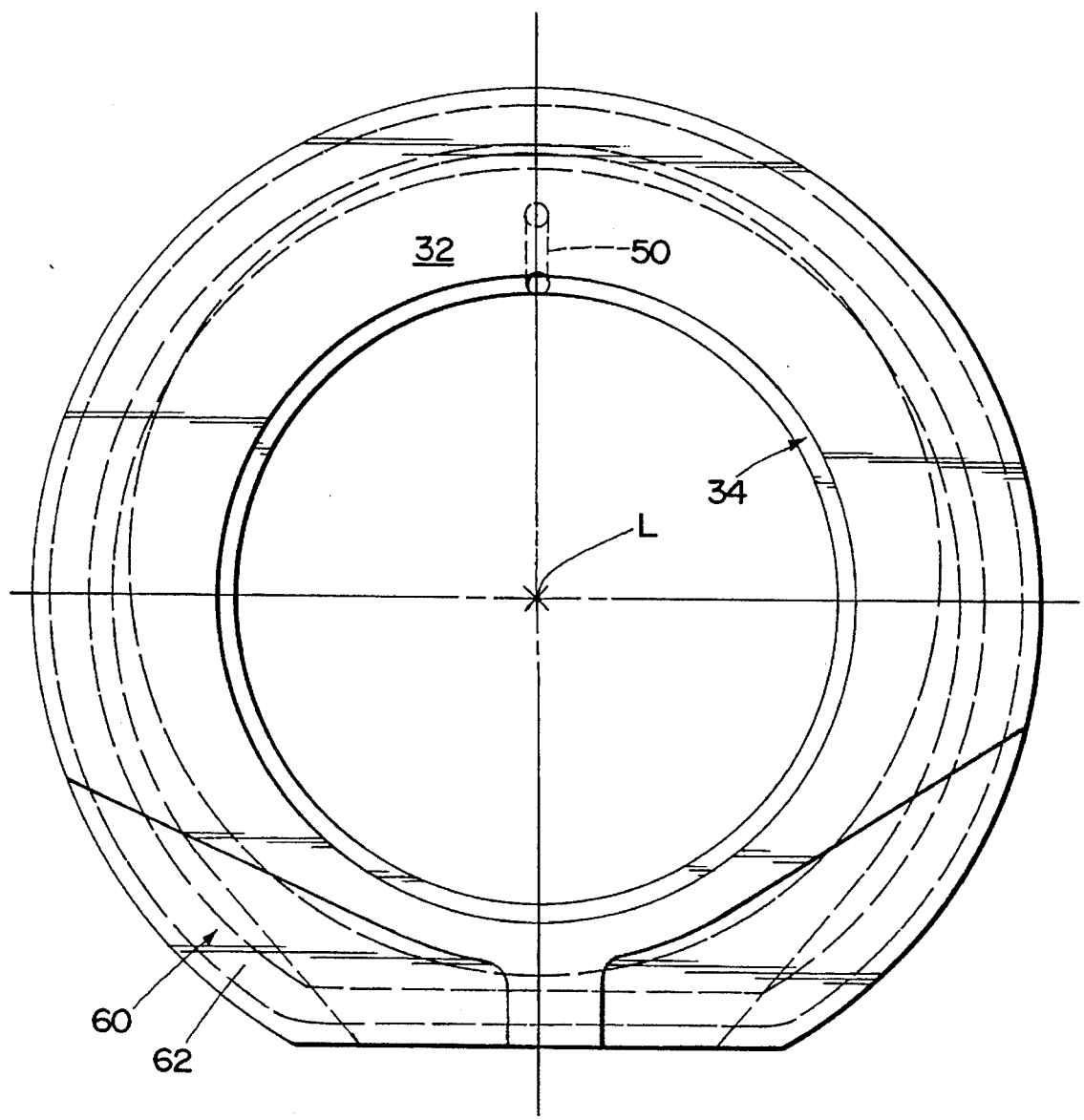
FIG. 3 is an elevated face end view of the bearing apparatus shown in FIG. 1 taken through line 3—3.

With continued reference to FIG. 1 but with additional reference to FIGS. 2 and 3, the bearing apparatus 10 is illustrated in axial cross section and elevational face end views respectively. The liner insert 14 is substantially cylindrical and is preferably formed of a leaded bronze alloy material such as a 20% lead alloy available from Western Reserve Manufacturing Co. as #520 although other materials may be used, for example, any bronze, brass, or other alloy having suitable bearing characteristics. The carrier sleeve 12 is also substantially cylindrical and is preferably formed of an aluminum alloy such as AMS 4145 (4032 forging stock) although other materials may be used, for example, 2024, 6061 or other aluminum alloy, matrix composites or any other material with suitable mechanical properties, including non-metallic materials such as plastics or ceramics.

The insert is joined to the outer carrier sleeve 12 through a separate pair of independent radial interference fit connections 18, 20. In the threaded region B, male threads 22 on the insert 14 intermate with female threads 24 on the carrier sleeve 12 to define a spiral pattern radial interference fit connection 18. At the cylindrical section C, an interior smooth bore 26 provided in the sleeve 12 engages a cylindrical outer surface 28 of the liner 14 to form an uninterrupted cylindrical radial interference fit connection 20.

The insert 14 is substantially cylindrical within both threaded region B and the cylindrical section C of the bearing apparatus 10. However, in the flange region A, the insert 14 includes an enlarged radially extending integral flange 30 preferably formed of the same material comprising the remainder of the insert 14 which is preferably the above noted leaded bronze. The flange 30 includes a planar face surface 32 which is disposed substantially perpendicular to the longitudinal axis L. The face surface 32 provides a bearing thrust surface suitable for engagement with a gear or other mechanism which may be fixed to and rotate with an operatively associated external shaft member (not shown) within the bore 16. The face surface 32 defines a substantially annular smooth raceway surface upon which a gear or other rotating thrust compensating member may contact.

A small relief 34 is machined into the otherwise smooth face surface 32 of the flange 30 for improved lubricating capabilities. In the preferred embodiment, the relief 34 is circular and continuous along the bore 16 for an even distribution of lubricating fluids.

The thrust flange 30 further defines a substantially annular smooth connecting surface 36 opposite the face side 32 thereof which is adapted to engage corresponding sealing surfaces 40, 42 provided on a substantially planar face 44 of the outer sleeve 12. The connecting surface 36 lies in a plane which is substantially perpendicular to the longitudinal axis L and parallel to the plane of the face side 32.

The inner sealing surface 40 and outer sealing surface 42 establish intimate contact with the smooth connecting surface 36 of the flange 30 to define a pair of annular mechanical seals 46 and 48 respectively when the liner 14 is threaded tightly into the sleeve 12 as illustrated best in FIG. 2. The outer seal 48 provides a first seal against the flow of pressurized fluid into the region between the liner and sleeve. The redundant or inner seal 46 of course provides a second annular mechanical interference seal within the outer first seal 48.

Further in connection with the flange region A, at least one relief passageway 50 is included in the insert 14 for the purposes of providing a pressure relief at the interface region 52 between the sleeve 12 and insert 14. The relief passageway 50 defines a fluid escape between the sleeve/insert interface and an annular relief 54 machined into the face surface 44 of the sleeve 12.

Lastly in connection with the flange region A, the outer sleeve 12 includes a continuous circumferential groove 60 provided between the inner sealing surface 40 and the outer sealing surface 42. The groove 60 is adapted to receive an elastomeric sealing member 62 which, in the preferred embodiment is a rubber O-ring. As best illustrated in FIG. 2, each of the inner and outer sealing surfaces 40, 42 of the liner mechanically engage the connecting surface 36 of the flange member 30. While in the position illustrated, the O-ring 62 is compressed between the liner and sleeve and entrapped within the groove 60. As best shown in FIG. 3, the groove is slightly "D" shaped to correspond as close as possible to the outer extremities of the flange and sleeve interface. It has been found that the O-ring is most efficient when disposed as close as possible to the outer edge of the flange 30 and sleeve 12 in the radial plane.

Figure 4:
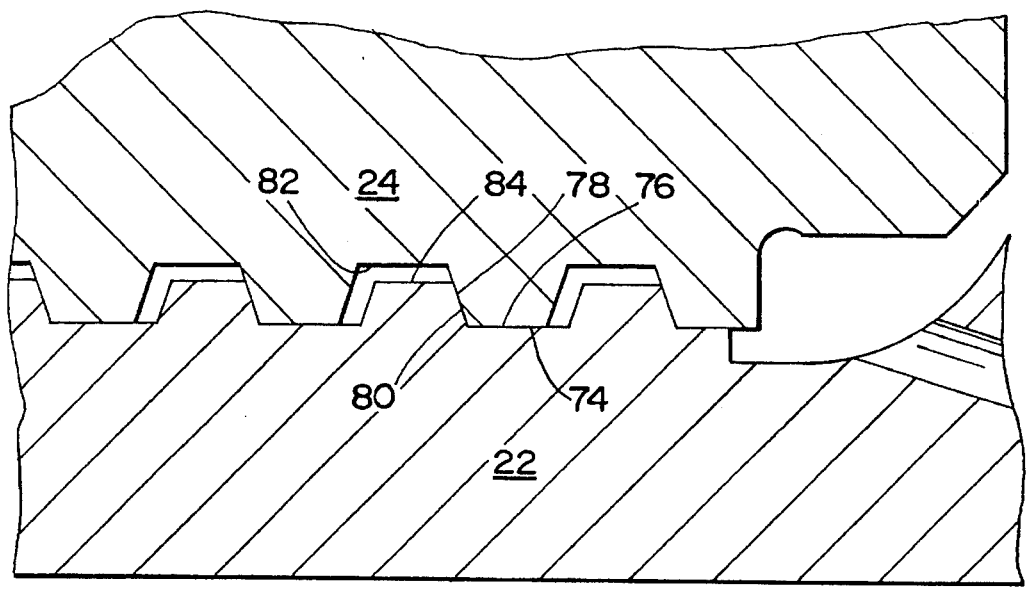
FIG. 4 is an enlarged cross-sectional view of the dot-and-dash cross-sectional portion of the bearing apparatus illustrated in FIG. 2.

Turning now to the threaded region B of the light weight bearing apparatus 10, male threads 22 on the insert 14 mate with female threads 24 on the carrier sleeve 12 to define a spiral pattern radial interference fit connection 18. As best shown in FIG. 2, the male threads 22 define a large radial diameter 70 about the longitudinal axis L while the female threads 24 on the carrier sleeve 12 define a smaller radial diameter 72 about the longitudinal axis L. The spiral pattern radial interference fit connection 18 is established at the small diameter 72 between the flattened tips 74 of the female threads 24 and the roots 76 of the male threads 22 disposed on the insert 14. The details of the spiral interference fit connection 18 are best illustrated FIG. 4 which is an enlargement of the cross-sectional dot and dash portion of FIG. 2. The roots 76 of the male threads 22 at the small diameter 72 establish the spiral radial interference fit connection. In addition, the forward facing flanks 78 of the male threads 22 engage the rearward facing flanks 80 of the female threads 24 when the insert 14 is threaded into the sleeve 12 such that the surfaces 36 and 44 engage as illustrated in FIG. 2. The roots 82 of the female threads 24 do not engage the flat tips 84 of the male threads The preferred thread joint illustrated in FIG. 4 employs a modified ACME thread layout wherein the male threads 22 on the liner 14 are cut with a standard stub ACME thread form tool and the female threads 24 on the sleeve 12 are cut with a standard full height ACME thread form tool but with a portion of the cutter tip removed therefrom in order to establish a wider valley section in the female thread than would otherwise be possible without removing excessive amounts of the sleeve material. Several other thread forms and manufacturing techniques are also possible.

Referring again to FIG. 2, at the cylindrical section C, the interior smooth bore 26 in sleeve 12 engages the cylindrical outer surface 28 of the liner 12 to form an uninterrupted cylindrical radial interference fit connection 20. It is to be noted from FIG. 2 that both the smooth bore 26 and outer surface 28 are held as close as possible to the small diameter 72 at which the spiral pattern radial interference fit connection 18 is established in the threaded region B. For both the cylindrical radial interference fit connection 20 and the spiral radial interference fit connection 18, positive contact between the liner and sleeve is established in each of the threaded region B and cylindrical section C. This is because of the substantially uniform radial interference fit along the small diameter 72. The dual radial interference fit is preferred because it compensates for radial differential thermal expansion between the liner and sleeve and also serves to provide prevailing torque to prevent rotational movement between the liner and sleeve. In addition, the preferred dual interference fit shown in the FIGURES, provides a positive path for heat conduction between the liner insert working surfaces and the outer sleeve and surrounding support structure (not shown). Lastly, the combined contact area of the interference fit connections 18, 20 greatly exceeds the thread 22, 24 contact area on the flanks thereof. Thus it is extremely unlikely that any loosening of the joint will occur.

Mechanically, the combined spiral pattern and uninterrupted cylindrical radial interference fit connections 18, 20 ensure a positive support of the liner insert 14 along its full length. Support is evenly distributed about the longitudinal axis L, to transmit mechanical forces to the surrounding housing structure without distortion of the liner working surfaces due to inadequate support.

The tail section D of the light weight bearing apparatus 10 includes a circular relief 90 established along the longitudinal axis L between the back face 92 of the liner insert 14 and a secondary front face 94 of the carrier sleeve 12. Axial clearance is thereby provided along the longitudinal axis L in order to accommodate differential axial thermal expansion between the liner 14 and the sleeve 12. This arrangement is preferred because it permits minimal distortion of the thrust face 32 even in bearings having high length to diameter L/D ratios.

Figure 5:
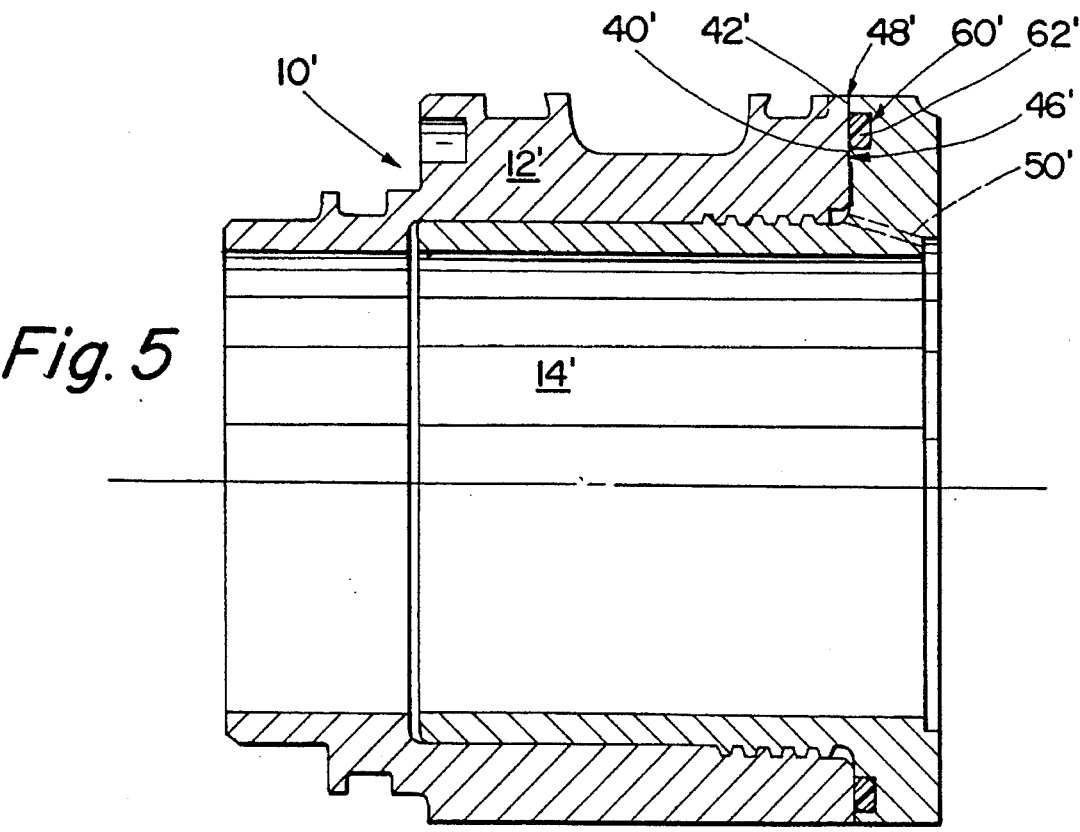
FIG. 5 is an axial cross-sectional view of the bearing apparatus shown in FIG. 1 taken along line 2—2 illustrating a first alternative embodiment.
Figure 6:
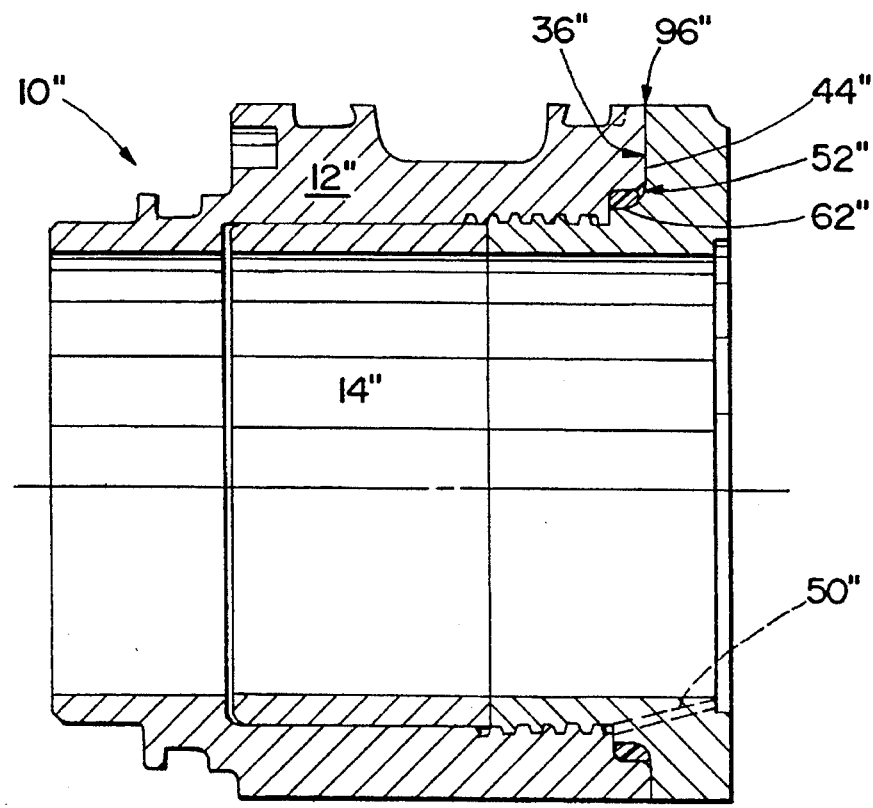
FIG. 6 is an axial cross-sectional view of the bearing apparatus shown in FIG. 1 taken along line 2—2 illustrating a second alternative embodiment.

FIGS. 5 and 6 show alternative embodiments of the bearing apparatus of the present invention. For ease of the illustration and discussion, like elements will be referred to by like numerals with a primed (') suffix, and new elements will be referred to by new numerals. Turning initially to FIG. 5, a first alternative arrangement of the preferred light weight bearing apparatus illustrated in FIGS. 1–4 is illustrated wherein the groove 60' is provided in the liner insert 14' rather than within the carrier sleeve 12' as earlier described. The groove 60' accommodates a corresponding O-ring 62' which is preferably of sufficient cross-section to be compressed between the liner and sleeve when those two parts are mated such as shown in the FIGURE.

In addition, the inner and outer sealing surfaces 40', 42' are defined in the liner insert 14' rather than in the carrier as earlier described. The inner and outer sealing surfaces 40', 42' establish inner and outer annular mechanical seals 46', 48', respectively, in a manner equivalent to that discussed in conjunction with the first preferred embodiment illustrated in FIG. 2.

Other than the reversed placement of the O-ring and related sealing surfaces shown, the bearing assembly of FIG. 5 is functionally equivalent to that shown in FIG. 2. Overall, however, the bearing apparatus of FIG. 2, may be preferred over that shown in FIG. 5 when manufacturability is a major concern. That is, it has been found that it is generally more difficult to machine the groove 60' into the liner insert 14' as illustrated in FIG. 5 than it is to machine the carrier 12 as shown in FIG. 2. In situations where the manufacturability is not a major concern, however, it is possible that the bearing apparatus 10' shown in FIG. 5 may be preferred under certain circumstances or for particular applications.

FIG. 6 illustrates a radially oriented seal arrangement as a second alternative embodiment whereby the contacting surface 36" of the liner insert 14" engages the face surface 44" of the carrier 12" at a single uninterrupted annular mechanical seal 96. An O-ring 62" is entrapped between the sleeve and insert at an interface region 52" provided between the seal 96 and the threaded region B" of the light weight bearing apparatus 10" illustrated in the FIGURE. In certain applications, the bearing apparatus illustrated in FIG. 6 may be preferred over the first two embodiments discussed above. However, it has been found that the embodiment illustrated in FIG. 6 subjects the flange to larger bending loads, mainly due to the inboard placement of the O-ring seal and, therefore, may not always be preferred over the arrangements illustrated in FIGS. 1–5.

Figure 7:
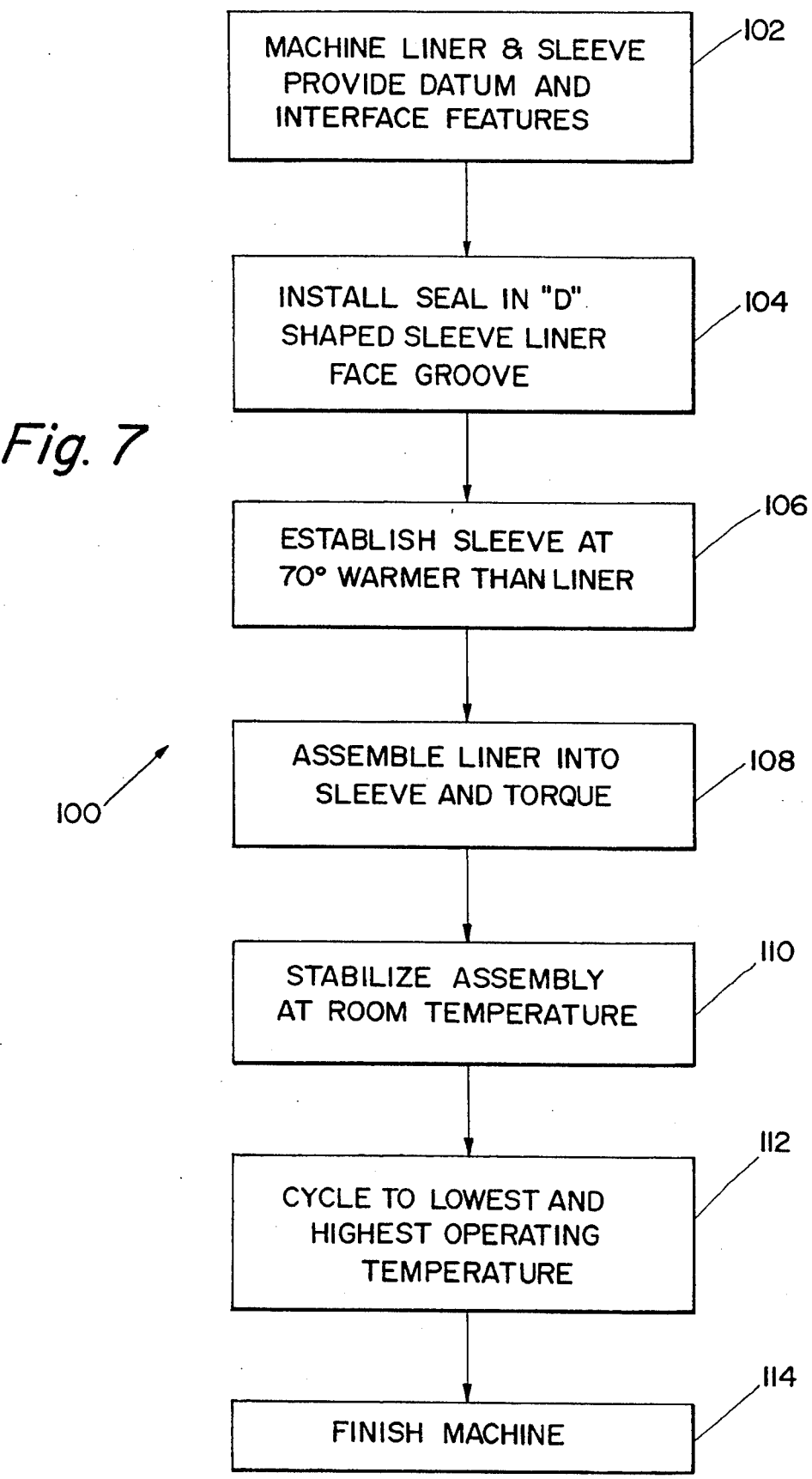
FIG. 7 is a flow chart illustrating a preferred method of manufacturing the light weight bearing apparatus of the instant invention.

With reference lastly to FIG. 7, the method 100 of assembling the light weight bearing apparatus shown in FIGS. 1–6 will be discussed. Initially, at step 102, the liner 14 and sleeve 12 are machined using well known fabrication techniques such as NC milling, drilling and thread forming procedures well known to those skilled in the art. Also at this machining step, the datum and interface features such as the inner and outer sealing surfaces 40 and 42 are established along with the groove 60 in one of the component parts.

Next, at step 104, the O-ring 62 is inserted into the groove 60 defined in the sleeve 12 at step 102.

A thermal differential is established at step 106 between the sleeve and insert to compensate for the interference fit connections 18 and 20. In general, it has been found that, using the preferred materials identified above, a temperature differential where the sleeve is about 70° hotter than the liner results in a relative radial size differential where the liner is easily threaded into engagement with the sleeve and the faces 36, 44 fully engage. Larger temperature differential may be necessary to allow longer working time for assembly. Other temperatures would be required for other material compositions.

Next, at step 108, the liner is assembled into the sleeve and torqued to the appropriate specifications. The assembly of the liner into the sleeve is of course performed while the parts are maintained at the temperature differential.

The assembled bearing is stabilized to room temperature at step 110. It is during the stabilization within which the interference fit connections are established. Generally, the relative radial growths between the liner and sleeve cause the liner to become captured within the sleeve at the smaller diameter dimension 72.

In order to "season" or otherwise stress relieve the bearing assembly 10, the completed assembly is cycled to its anticipated lowest and highest operating temperatures at step 112. In the preferred embodiment, the bearing assembly is maintained above 290° for five minutes and then below −35° for five minutes constituting a complete cycle. A plurality of these cycles may be performed in order to relieve any stresses which may have been imparted into the bearing structure during the assembly or stabilization steps 108, 110.

Lastly, the bearing is returned to a normal room temperature where finish machining operations are performed at step 114. Generally, the finish machining work does not significantly elevate the temperature of a bearing assembly to impart any additional stress or otherwise damage the part.

The invention has been described with reference to the preferred and alternative embodiments. Modification and alterations will occur to others upon reading and understanding of this specification. It is my intention to include all such modifications and alterations insofar as they come within the scope of the appended claims or equivalents thereof.

Having thus described the invention, I now claim:

1. A bearing apparatus comprising:

a sleeve having a first sleeve surface defining an elongate substantially cylindrical aperture along a first longitudinal axis and a second sleeve surface defining a groove in said substantially cylindrical aperture;

a substantially cylindrical liner disposed in said sleeve along said first longitudinal axis and having a first liner surface interference fit connected to said first sleeve surface and a second liner surface interference fit connected to said groove; and, said groove in said second sleeve surface being a helical groove and said second liner surface including a helical formation received in said groove.

2. The bearing apparatus according to claim 1 wherein:

said first and second sleeve surfaces are substantially smooth interior surfaces of the sleeve;

said first and second liner surfaces are substantially smooth exterior surfaces of the liner; and, at least a one of the first sleeve surface and the first liner surface are adapted to interference fit connect with the other of the first sleeve surface and the first liner surface along a substantially continuous cylindrical interface centered on said first longitudinal axis.

3. The light weight bearing apparatus according to claim 2 wherein at least a one of the second sleeve surface and the second liner surface are adapted to interference fit connect with the other of the second sleeve surface and the second liner surface along an elongate continuous interface uniformly spaced from said first longitudinal axis.

4. The light weight bearing apparatus according to claim 3 wherein:

said second sleeve surface defines a first fastening member along said first longitudinal axis; and, said second liner surface defines a second fastening member adapted to engage said first fastening member.

5. A bearing apparatus comprising:

a sleeve having a first sleeve surface defining an elongate substantially cylindrical aperture along a first longitudinal axis and a second sleeve surface defining a groove in said substantially cylindrical aperture;

a substantially cylindrical liner disposed in said sleeve along said first longitudinal axis and having a first liner surface interference fit connected to said first sleeve surface and a second liner surface interference fit connected to said groove;

said first and second sleeve surfaces being substantially smooth interior surfaces of the sleeve;

said first and second liner surfaces being substantially smooth exterior surfaces of the liner;

at least a one of the first sleeve surface and the first liner surface interference fit connected with the other of the first sleeve surface and the first liner surface along a substantially continuous cylindrical interface centered on said first longitudinal axis;

at least a one of the second sleeve surface and the second liner surface interference fit connected with the other of the second sleeve surface and the second liner surface along an elongate continuous interface uniformly spaced from said first longitudinal axis;

said second sleeve surface defining a first fastening member along said first longitudinal axis;

said second liner surface defining a second fastening member adapted to engage said first fastening member;

said first fastening member comprises a series of internal threads on the sleeve; and, said second fastening member comprises a series of external threads on the liner, wherein at least a one of the series of internal threads and the series of external threads are adapted to radially interference fit engage the other of the series of internal threads and the series of external threads along a substantially helical interface centered on said first longitudinal axis.

6. The bearing apparatus according to claim 5 wherein said sleeve defines a substantially annular face surface in a first plane perpendicular to said first longitudinal axis; and, said liner extends from the sleeve along said first longitudinal axis and includes a lip defining a substantially annular base surface in said first plane adapted to engage said substantially annular face surface.

7. The bearing apparatus according to claim 6 wherein said substantially annular face surface of the sleeve engages the substantially annular base surface of the liner along an annular continuous interface connection perpendicular to said first longitudinal axis.

8. The bearing apparatus according to claim 7 wherein the substantially annular face surface of the sleeve includes means defining a continuous groove in a plane perpendicular to said first longitudinal axis, the groove being adapted to receive a continuous sealing element therein.

9. The bearing apparatus according to claim 8 wherein the substantially annular face surface of the sleeve includes at least one relief port having an opening on the annular face surface between the groove and said first longitudinal axis.

10. The bearing apparatus according to claim 9 wherein said sleeve is formed of aluminum and said liner is formed of leaded bronze.

11. A bearing apparatus comprising:

a carrier member having i) a substantially cylindrical first carrier surface and ii) an elongate helical second carrier surface; and, an insert within said carrier member having i) a substantially cylindrical first insert surface interference fit connected to said first carrier surface and ii) an elongate helical second insert surface interference fit connected to said second carrier surface.

12. The bearing apparatus according to claim 11 wherein said carrier member is aluminum and said insert is leaded bronze.

13. The bearing apparatus according to claim 12 wherein said carrier member defines a substantially annular face surface in a first plane perpendicular to a longitudinal axis of said cylindrical first carrier surface; and, said insert extends from said carrier member along said first longitudinal axis and includes a lip defining a substantially annular base surface in said first plane adapted to engage said substantially annular face surface.

14. The bearing apparatus according to claim 13 wherein said substantially annular face surface of the carrier member engages the substantially annular base surface of the insert along an annular continuous interface connection perpendicular to said longitudinal axis.

15. The bearing apparatus according to claim 14 further comprising an elastomeric seal disposed between said substantially annular face surface of the carrier member and the substantially annular base surface of said insert.

* * * * *